United States Patent [19]

Allievi

[11] 4,298,302
[45] Nov. 3, 1981

[54] APPARATUS FOR TAKING OUT AND FEEDING SINGLE V-SHAPED STRIPS

[75] Inventor: Alberto Allievi, Milan, Italy

[73] Assignee: Amia di Adolfo e Alberto Allieve & C.S.N.C., Milan, Italy

[21] Appl. No.: 81,085

[22] Filed: Oct. 1, 1979

[30] Foreign Application Priority Data

Oct. 13, 1978 [IT] Italy .............................. 28745 A/78

[51] Int. Cl.³ .............................................. B65G 59/06
[52] U.S. Cl. ................................ 414/126; 29/243.58; 221/298; 270/53
[58] Field of Search ........................ 414/112, 125, 126; 29/243.57, 243.58, 243.5, 818; 221/221, 251, 292, 293, 298; 270/37, 53

[56] References Cited

U.S. PATENT DOCUMENTS

| | | | |
|---|---|---|---|
| 2,974,828 | 3/1961 | Matteson | 221/298 X |
| 3,468,455 | 9/1969 | Voorhis | 221/251 X |
| 3,477,592 | 11/1969 | Kuhlman | 414/125 |
| 3,513,758 | 5/1970 | Patty | 270/53 X |
| 3,520,046 | 7/1970 | Erhardt et al. | 29/243.58 X |
| 3,542,243 | 11/1970 | Stockdale | 221/221 |
| 3,701,440 | 10/1972 | Windstrap et al. | 414/125 |
| 3,903,580 | 9/1975 | Lam | 29/243.58 X |

Primary Examiner—Leslie J. Paperner
Attorney, Agent, or Firm—Wenderoth, Lind & Ponack

[57] ABSTRACT

An apparatus for removing a single metallic V-shaped strip from a package thereof and for feeding such single strip, in particular a strip suitable for binding printed, to a further process includes a pair of conical noses adapted to be inserted between the last and penultimate strips of a substantially vertically supported and guided strip package. This insertion disengages and makes free the last strip, while temporarily supporting the package, and normal package supports are shifted to an inoperative position during such insertion.

14 Claims, 14 Drawing Figures

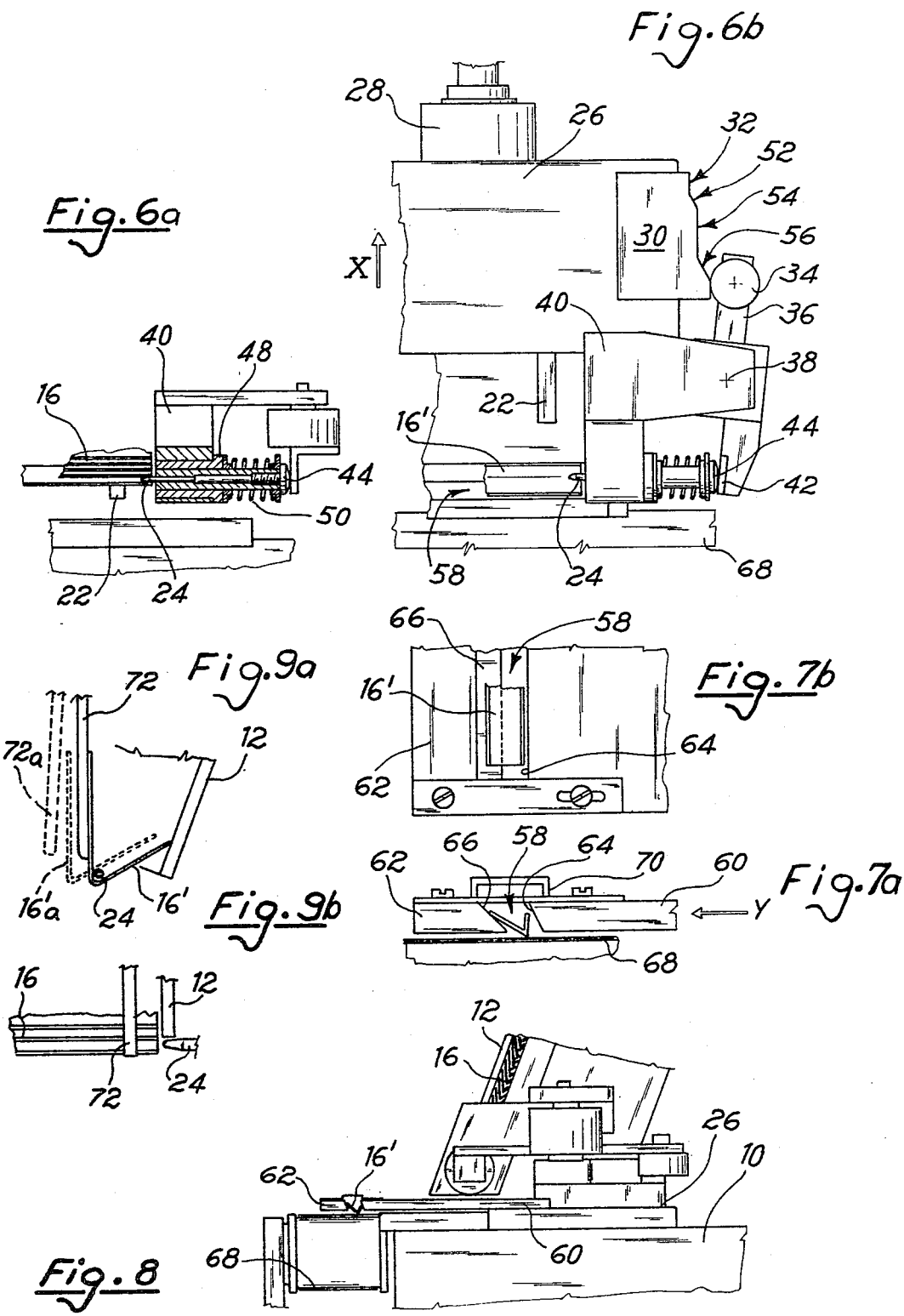

APPARATUS FOR TAKING OUT AND FEEDING SINGLE V-SHAPED STRIPS

BACKGROUND OF THE INVENTION

1. Field of the Invention

This invention relates to an apparatus for removing from a package of metallic strips a single strip and for subsequently feeding the single strip, in particular for binding printed sheets or the like which are inserted with an edge thereof into a strips opening and then retained therein by squashing the strip in punch-like machine.

Such punch machines comprise a punching means which is controllably lowered on the strip after manual positioning thereof against suitable end stops and after manual insertion of a printed sheet or sheets into the strip opening. The manual operation of positioning each strip under the punching means reduces productivity, in particular due to the great loss of time for taking-out a single strip from a package thereof and/or for exactly orientating the same when the strips are randomly disposed. Further, the above positioning operation of removed single strips in the punching zone can be dangerous for the operator, if suitable devices are not provided for in order to avoid the punching means lowering while the operator's fingers are under such punching means.

Accordingly, it is highly important to have an equipment for automatically carrying-out the operations of taking-out single strips from a package thereof and feeding the single strips to the punching position.

In order to obtain such results it is necessary to overcome the difficulty due to the fact that the strips are tightly packaged and thus a force is required in order to disengage the last strip from the package, while ensuring that the penultimate strip is retained.

Further, it is necessary that each strip be fed to a downstream station, namely to the punching machine, with an exact positioning and orientation in order to avoid any manual correction thereon.

2. Description of the Prior Art

An apparatus for removing and feeding the strips has been proposed in the art, such apparatus using a magnetic field to disengage each strip from the package. However, such known apparatus satisfactorily operates only when the necessary force to disengage the strips is very small, i.e. when the strip base an apex angle which is quite large and such strips substantially have an L-shaped configuration. Accordingly, this known apparatus cannot operate on v-shaped strips, or on strips not formed of a ferromagnetic material.

SUMMARY OF THE INVENTION

An object of this invention is to provide an apparatus for automatically and reliably carrying-out the operations of removing single V-shaped strips from a package thereof and subsequently feeding the same, in a suitable position and orientation, to downstream stations, in particular to a punching machine.

Another object of this invention is to provide an apparatus of the type referred to, wherein the operations are carried out by simple mechanical means allowing an easy adaptation of the apparatus to differently sized strips.

Essentially, according to this invention, the above and further objects are attained by an apparatus comprising, a storage member within which is housed a package of mutually inserted V-shaped strips having downwardly directed at least one; apexes end stroke bearing means to support the package on the last bottom strip; a pair of conical noses longitudinally aligned at opposite ends or the last strip and having an axis longitudinally coincident with a free space between the last and penultimate strip apexes; controlling means for carrying-out coordinate retraction motions of the end stroke bearing means until reaching an inoperative position and forward motions of the noses between the last and penultimate strips until disengaging the last strip from the package and supporting the package; controlling means for carrying-out coordinate motions to an operative position of the bearing means and to an inoperative position of the noses; and means for feeding to further operation the disengaged strip.

BRIEF DESCRIPTION OF THE DRAWINGS.

FIGS. 6a and 6b are views similar to FIGS. 5a and 5b, respectively, showing the apparatus in a strip disengaging end position;

FIGS. 7a and 7b are respectively a partial side view and a partial top view showing an apparatus for receiving a disengaged strip and subsequently forwarding the same to a downstream operation strip feeder;

FIG. 8 is a partial side view of the apparatus during a strip forwarding step to the feeder; and FIGS. 9a and 9b are respectively an end view and a side view fitting for obtaining a reliable strip disengaging operation.

DETAILED DESCRIPTION OF THE PREFERRED EMBODIMENT

Figure 1:
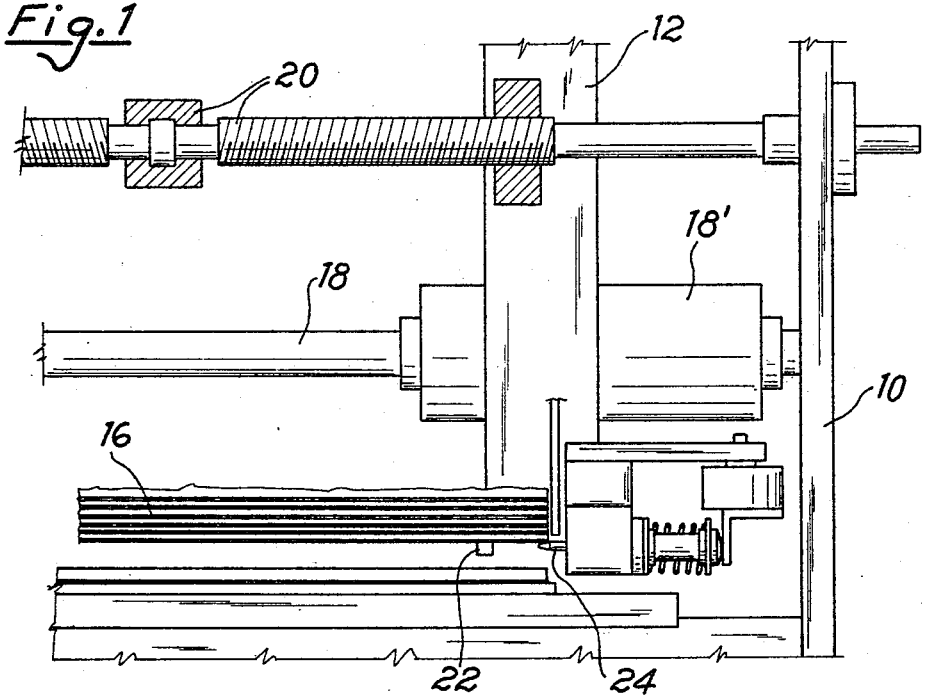
FIG. 1 is a partial front view, with portions in section, of a prefered embodiment of the apparatus of this invention.
Figure 3:
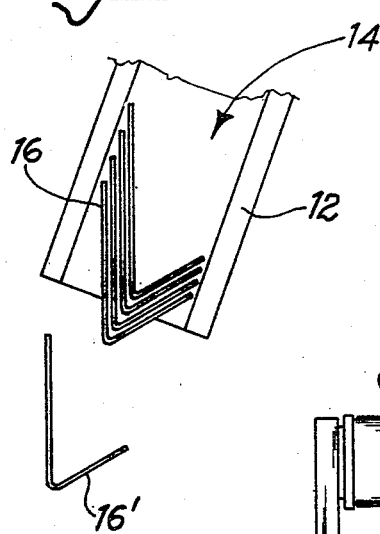
FIG. 3 is a cross-section in a plane perpendicular to the of the strips and showing a strip package within a store guide of the apparatus according to this invention, one of the strips being disengaged from the package.
Figure 2:
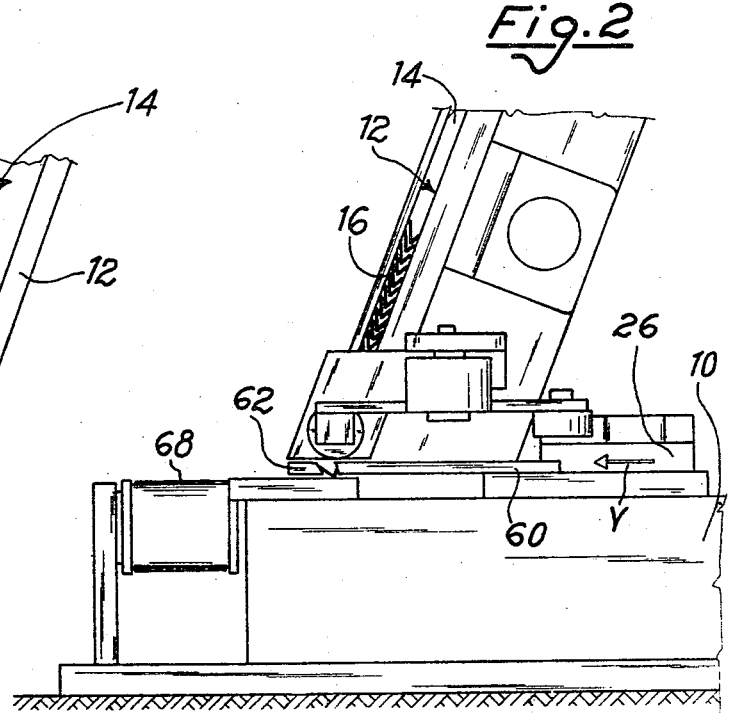
FIG. 2 is a partial side view of the apparatus

The illustrated apparatus comprises a supporting frame 10 carrying a pair of parallel spaced guides 12 (only one of which is shown in the drawings) having a U-shaped inner seat 14 (see FIGS. 2 and 3) wherein the ends of metallic strips 16 are retained, such strips being V-shaped in cross section and packaged, i.e. mutually inserted with the apexes thereof slightly spaced, as shown in FIG. 3. These strips generally have one asymmetric shape with an arm having a length greater than the other arm and, due to an acute apex angle, they are tightly rested with each other due to friction so that in order to disengage one strip 16' from the other packaged strips 16 it is necessary to exert a given separating force between strip 16' and the last packaged strip 16.

As shown guides 12 have opposed U-shaped seats 14 wherein the strip package freely downwardly flows or moves due to its weight, thanks to a suitable or incline slant of guides 12, which are essentially vertically oriented but in any case form an angle different from 0° with the vertical plane, so that the packaged strips 16 always rest on one side of seat 14 to provide a fixed reference for the clearances of a strip disengaging system which must operate with high precision.

Guide 12 are slidably mounted in a horizontal direction on supports 18 with bearings 18' so that they can be adjusted together with the strip disengaging system, for instance by a known nut system 20 in order to conform with strips having different lengths.

Strip package 16 is inserted into suitably registered guides 12 according to the strip length, so that the strips may descend by gravity along the guides until the last strip in the package is retained by end-stroke stops 22 which are advantageously positioned near the ends of the packaged strips, to provide a precise positioning of such strips and in particular of the last strip, in a vertical direction.

The disengagement operation of the last strips from the package is carried-out by coordinate motions of end-stroke stops 22 and a pair of conical noses 24 which penetrate into the free space between the last and penultimate strips and then, due to their conical shape, exert a separating force on the last strips, which is sufficient for completely disengaging the same from the package, while supporting the package by the same noses. In order to obtain such operation, it is very important that the retraction movement of stops 22 and insertion movment of conical noses 24 be coordinnated in order to always ensure that the package is supported and to avoid that the strip under disengagement from being forced between noses 24 and stops 22 and thereby being deformed.

Always according to this invention, the above is obtained by coordinating the motions of noses 24 to those of stops 22.

To this end, stops 22 are carried by a slidable plate 26 which is reciprocally and rectilinearly moved in a trasversal direction by motor means 28, for instance in the form of cylinder-piston assemblies, stops 22 being further longitudinally adjustable, together with guides 12, in order to always allow a positioning thereof near the strip ends. Slidable plate 26 has a sidewardly located cam means 30 that can be adjusted in a longitudinal direction, parallel to the packaged strips 16. Cam means 30 has a cam profile 32 on which a cam follower in the form of a roller 34 runs, roller 34 being mounted at the end of a lever which is pivoted on a vertical axis 38 carried by a supporting block 40. Supporting block 40 is adjustable in a longitudinal direction, according to the length of strips 16. The end of lever 36 which is opposed to roller 34 has a pushing surface 42 acting on a rounded head 44 of a rod 46 which is axially movable in a bearing fixed to block 40 and which carries nose 24. The above may be seen in FIGS. 4a, 4b, 5a, 5b 6a and 6b which further show a spring 50 urging rod 46 against surface 42 so as to always maintain roller 34 in an operative contacting position with profile 32 of cam 30.

Figures 4A, 4B:
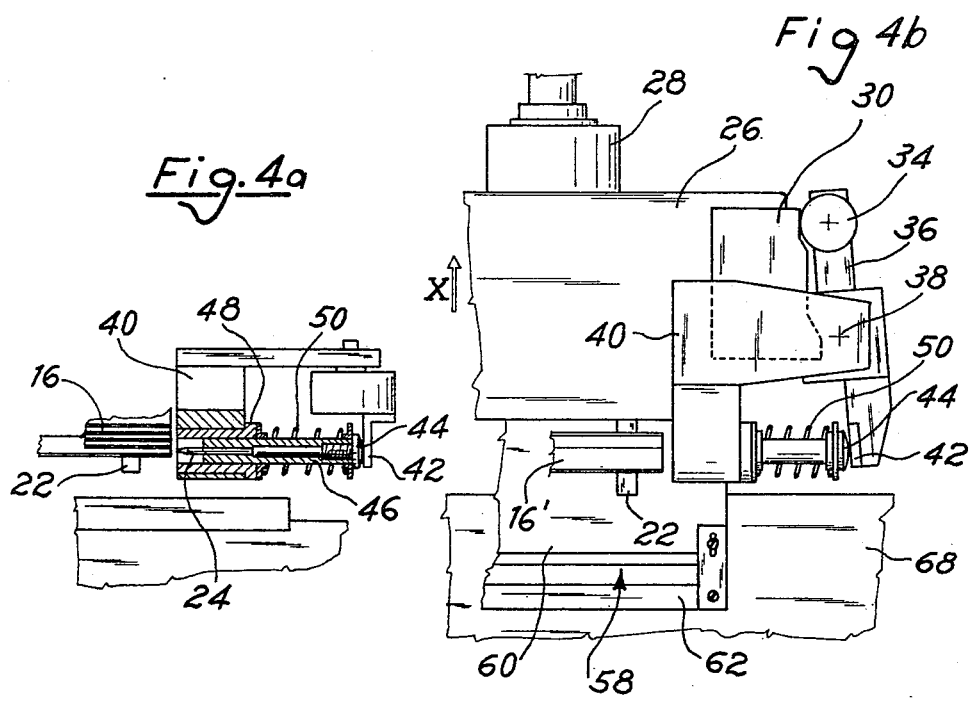
FIGS. 4a and 4b are respectively a partly sectioned front view and a top view of an apparatus to carry-out a disengagement of the last strip, such apparatus being shown in a rest position.

The sequence of steps allowing a disengagement of the last strip 16' from package is shown in FIGS. 4a, 4b, 5a, 5b, 6a and 6b. FIGS. 4a and 4b show the device components in a rest condition, i.e. before motor means 28 is operated. In this position noses 24 are retracted and the strip package is supported by stops 22.

Figures 5A, 5B:
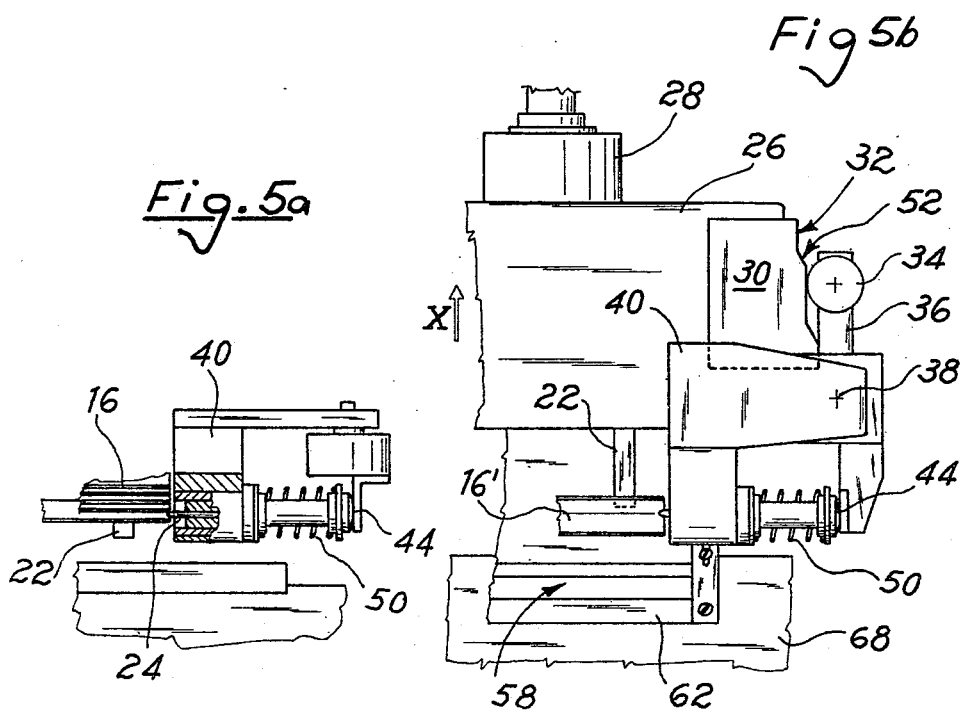
FIGS. 5a and 5b are views similar to FIGS. 4a and 4b, respectively showing the apparatus in an intermediate position during a strip disengaging operation.

When the motor means are operated, for instance by a suitable operator control of a known type, they carry-out a backward motion of plate 26, in the direction of arrow X, and accordingly partially retract stops 22 and move cam profile 32 with reference to roller 34 (FIGS. 5a and 5b). Cam profile 32 has a first step 52 controlling a first partial motion of noses 24 so that they are exactly inserted into the free space between the last and penultimate strip and support the strip package, with exception of the last strip 16', without forcing last strip 16' against stops 22.

Cam profile 32 has after step 52, a rectilinear length 54 which is parallel to the motion of plate 26 and maintains noses 24 in the partially inserted position supporting the package during a subsequent retraction motion of stops 22 until reaching a position wherein the last strip 16' no longer supported by stops 22. In this condition, last strip 16' is freely disengageable from the strip package, but it is still retained by a great friction force arising from the strip packing conditions.

In order to carry-out disengagement of last strip 16', cam profile 32 has another step 56 which, due to the further motion of plate 26 in direction X, controls a further insertion motion of noses 24 between the last and penultimate strips. Due to a suitable conical shape of noses 24, this motion forces the last strip 16' to completely disengage from the package and to fall downwardly due to gravity. The reverse motion in direction y of plate 26 causes an inverse sequence of the above stated motions, comprising a first partial retraction of noses 24, but still supporting the strip package, an advancement of stops 22 until positioning the same under the package, and a second retraction of the noses to an inoperative position as shown in FIGS. 4a and 4b. Accordingly, the strip package lightly moves downwardly until resting on stops 22 and thus positioning the free space between the new last strip and the new penultimate strip into alignment with the axes of nose 24, thereby pre-setting the apparatus for a new disengaging operation.

In order to ensure the above stated alignment in a horizontal direction (vertical alignment being ensured by stops 22) suitable means can be provided for, in the form of fingers 72 (FIGS. 9a and 9b which are placed near the ends of strips 16 and can be operated by controlling means (not particularly shown) acting in cooperation with the above nose operating means in order to make a pivoting motion from position 72a to position 72 before a subsequent first insertion of noses 24.

Such finger motion to position 72 shifts the packaged strips and in particular the last strip from position 16'a to position 16', as defined by the bottom side of guide 12, to exactly position the free space between the last and penultimate strips in axial alignment with noses 24.

The disengaged strip 16' falls into a seat 58 as defined by a pair of rods 60, 62 which are parallel to the strip and coupled with plate 26 in such a manner that, when plate 26 is in its completely retracted position (FIGS. 6a and 6b), seat 58 is exactly aligned beneath strip 16' in a plane lower than that of stops 22. As can be seen in particular from FIGS. 7a and 7b seat 58 has walls 64, 66 slanting from top to bottom in a backward direction, i.e. toward plate 26, in order to constrain strip 16' to assume a given orientation, actually resting on its longer side, both during fall into seat 58 and subsequent motion of seat 58, together with rods 60 and 62, as carried-out when plate 26 revets to its rest position of FIGS. 4a and 4b. This motion shifts seat 58 in a direction y perpendicular to the strip main axis until the strip is carried to a feeding carrier means, for instance in the form of a conveyor 68 (FIG. 8) that continuously runs in a direction parallel to main axis of strip 16' and carries strip 16' out of guide 58, under a connection 70 (FIGS. 7a) between rods 60, 62 on the strip outlet side.

Conveyor 68 carries strip 16' to a downstream operating station, for instance to a punching machine wherein, in a suitable position above conveyor 68, a stop retains the strip in order to allow the operator to insert printed sheets and punch strip on the same. With such a combination of an apparatus according to this invention and a strip punching machine of the above stated type, the control of motor means 28 in order to start a strip disengaging cycle may be suitably operated by the punching machine, in particular during the punching motion.

It is to be understood that many modifications may be made to the illustrated embodiment without departing from the spirit and scope of this invention.

What we claim is:

1. An apparatus for removing single metal strips from a package of such strips and for feeding said removed strips singly to a position of further utilization, each said strip comprising an elongated V-shaped member having an acute apex angle, said strips being nested together by friction contact between elongated arms of adjacent said strips with an elongated free space between apices of each adjacent pair of strips, thereby forming said package, said apparatus comprising:

storage means for storing therein a package of strips with the apices of said strips directed downwardly and such that said package is movable downwardly within said storage means due to gravity;

support means movable in opposite longitudinal directions orthogonal to the direction of the longitudinal axis of said package of strips between a first operative position, whereat said support means is beneath and supports said package by contact with the lowermost strip of said package, and a second inoperative position, whereat said support means is withdrawn from beneath said package;

separating means for separating said lowermost strip from said package and for allowing the thus separated strip to fall by gravity from said storage means, said separating means comprising a pair of longitudinal members positioned at opposite ends of said lowermost strip and having a common axis longitudinally coincident with the elongated free space between the apices of said lowermost strip and the next adjacent said strip, said pair of members having a facing conical ends, said members being simultaneously movable in opposite longitudinal directions between first inoperative positions whereat said conical ends are axially spaced from said elongated free space, second intermediate positions, whereat portions only of said conical ends extend into said elongated free space and support said package by contact therewith at locations on said conical ends midway between opposite smaller and larger diameter end portions thereof, and third separating positions whereat the entire said conical ends extend into said elongated free space, each said conical end having a diameter at said location thereof contacting said package when in said second intermediate position not greater than the size of said elongated free space, whereby said lowermost strip remains in friction contact with said next adjacent strip, and the diameter of said larger diameter end portion of each said conical end being greater than size of said elongated free space, whereby when said members move to said third separating position said lowermost strip is forceably separated from friction contact with said next adjacent strip and falls by gravity from said storage means;

control means, operatively connected to said support means and to said separating means, for sequentially moving said members from said first inoperative position thereof to said second intermediate position thereof, moving said support means from said first operative position thereof to said second inoperative position thereof, whereby said package is supported by said members, moving said members from said second intermediate position thereof to said third separating position thereof, whereby said lowermost strip is separated from said package and falls by gravity from said storage means, and vice versa; and means for receiving the thus separated said strip and for feeding said strip to a position of further utilization.

2. An apparatus as claimed in claim 1, wherein said storage means comprises a pair of parallel spaced guides aligned in a plane inclined at an angle with respect to a vertical plane.

3. An apparatus as claimed in claim 1 or claim 2, further comprising aligning means for pushing said lowermost strip in a direction transverse to the longitudinal axis thereof when said support means is in said first operative position thereof and when said members are in said first inoperative positions thereof, and for thereby insuring that said elongated free space is axially aligned with said members.

4. An apparatus as claimed in claim 3, wherein said aligning means act on one lateral side only of said lowermost strip.

5. An apparatus as claimed in claim 4, wherein said aligning means comprise a pair of fingers positioned adjacent opposite ends of said lower most strip and controllable by said control means.

6. An apparatus as claimed in claim 1, wherein said control means comprises a slidable plate movable in said orthogonal directions, said support means being mounted on said slidable plate for movement therewith, and on each lateral side of said slidable plate, a cam having a cam surface, a lever pivoted about a fixed axis, a first end of said lever having a cam follower bearing against said cam surface, a second end of said lever bearing on an end of a respective said member opposite said conical end thereof, and biasing means urging said member toward said first inoperative position thereof and said cam follower into contact with said cam surface.

7. An apparatus as claimed in claim 6, wherein said cam surface includes, with respect to said orthogonal directions, first step means for achieving movement of said respective members between said first inoperative and said second intermediate positions thereof, a parallel rectilinear portion for maintaining said member in said second intermediate position thereof during movement of said support means between said first operative and second inoperative positions thereof, and second step means for achieving movement of said member between said second intermediate and said third separating postions thereof.

8. An apparatus as claimed in claim 1, wherein said support means comprises a pair of straight rods located adjacent opposite ends of said package.

9. An apparatus as claimed in claim 1, wherein at least one of said storage means, said support means, said separating means and said control means is adjustable in a direction parallel to the direction of said longitudinal axis of said package.

10. An apparatus as claimed in claim 1, wherein said strip receiving and feeding means comprises a conveyor, and a strip receiving seat reciprocable between a strip receiving position beneath said storage means and a strip feeding position adjacent said conveyor.

11. An apparatus as claimed in claim 10, wherein said seat comprises a pair of parallel rods spaced to form therebetween a recess to receive a said strip.

12. An apparatus as claimed in claim 11, wherein said recess is defined by walls of said rods inclined downwardly with respect to the vertical to provide a desired strip orientation within said recess.

13. An apparatus as claimed in claim 10, wherein said conveyor moves in a direction parallel to said seat, and said seat has an opening in the downstream end thereof, with respect to the direction of movement of said conveyor.

14. An apparatus as claimed in claim 10, further comprising shift means, operable by said control means, for shifting said seat between said strip receiving and strip feeding positions thereof.

* * * * *